(12) United States Patent
Mirlay

(10) Patent No.: US 8,934,169 B2
(45) Date of Patent: Jan. 13, 2015

(54) DUAL OBJECTIVE 3-D STEREOMICROSCOPE

(76) Inventor: Ram Srikanth Mirlay, Karnataka (IN)

( * ) Notice: Subject to any disclaimer, the term of this patent is extended or adjusted under 35 U.S.C. 154(b) by 280 days.

(21) Appl. No.: 13/639,193

(22) PCT Filed: Mar. 7, 2011

(86) PCT No.: PCT/IN2011/000147
§ 371 (c)(1),
(2), (4) Date: Oct. 4, 2012

(87) PCT Pub. No.: WO2011/125067
PCT Pub. Date: Oct. 13, 2011

(65) Prior Publication Data
US 2013/0044369 A1 Feb. 21, 2013

(30) Foreign Application Priority Data
Apr. 4, 2010 (IN) .......................... 2992/CHE/2009

(51) Int. Cl.
*G02B 21/22* (2006.01)
*G02B 21/00* (2006.01)
*G02B 23/24* (2006.01)

(52) U.S. Cl.
CPC ............ *G02B 21/22* (2013.01); *G02B 21/0012* (2013.01); *G02B 23/2415* (2013.01)
USPC ............................ 359/376; 359/377; 359/378

(58) Field of Classification Search
CPC . G02B 21/22; G02B 21/0012; G02B 23/2415
USPC .................................................... 359/376–378
See application file for complete search history.

(56) References Cited

U.S. PATENT DOCUMENTS

| 5,331,457 | A | * | 7/1994 | Hanzawa et al. | ............. 359/377 |
| 5,341,239 | A | * | 8/1994 | Hanzawa | ..................... 359/377 |
| 5,969,854 | A | | 10/1999 | Stelzer et al. | |
| 2003/0231383 | A1 | * | 12/2003 | Zimmermann | ............... 359/376 |
| 2007/0047073 | A1 | | 3/2007 | Zimmer et al. | |

FOREIGN PATENT DOCUMENTS

CN 1143194 2/1997

* cited by examiner

*Primary Examiner* — Frank Font
(74) *Attorney, Agent, or Firm* — Sughrue Mion, PLLC

(57) ABSTRACT

The embodiments herein provide a dual objective stereomicroscope in which the two objectives are moved independent of each other along an angular axis by a mechanism to provide a stereoscopic image of an object. The microscope has two optical paths formed respectively with an objective lens, a primary mirror, a focusing mirror and an eye piece. The plane of the primary mirror is arranged normal to the plane of the objective lens. The focusing mirror is arranged in parallel to the primary mirror to reflect a beam of light received from the objective lens through the primary mirror to the eye piece. The primary mirror is moved synchronously with the movement of the objective lens.

20 Claims, 6 Drawing Sheets

DUAL OBJECTIVE 3-D STEREOMICROSCOPE

BACKGROUND

1. Technical Field

The embodiments herein generally relate to microscopes and particularly to stereomicroscopes. The embodiments herein more particularly relate to stereomicroscopes with dual objectives with variable inter-objective distances to increase visual angle to increase 3-D effect.

2. Description of the Related Art

The working with magnifying glasses and microscopes generally limits a freedom of movement. With magnifying glasses, the distance from the object is fixed and in addition, there is a very limited field of vision. This is particularly detrimental in the medical & surgical field. Magnifying glasses, with their two-dimensional vision, are often low powered and not convenient to operate. Surgical microscopes having two eyepieces with variable and adjustable inter pupillary distances (IPD) exist in the market. Normally, the adjustment of the IPD facilitates a comfortable viewing with two eyes. These microscopes are referred to as stereomicroscopes.

The main difference between the conventional microscope and the stereomicroscope is that the conventional microscope is used to observe a sample from a single direction, while the stereoscopic type microscope is used to observe an object from two significantly different angles thereby providing the two distinctly differing images needed for a stereoscopic vision. The stereoscopic microscope gives a three-dimensional view of the object, while the same object appears flat when viewed through a conventional microscope. This holds true even if the compound microscope has a binocular head and eyepieces because each eye sees almost exactly the same image due to a single objective lens system.

Normally, stereomicroscopes provide a single objective lens system with a beam splitter to provide a dual light path for viewing of an object so that one optical path is provided for each eye.

FIG. 1 shows a cross sectional view of a typical stereomicroscope 100. The stereomicroscope 100 comprises a housing 101. A single objective lens 102 is provided for focusing the light reflected from a target 103 onto a plurality of prisms 104 and 105, through separate paths to enable a binocular vision through eye pieces 106 and 107 mounted on the housing 101.

The single objective 102 feeds the light into a distinct lens pathway comprising of an arrangement of plurality of prisms and lenses 104 and 105 two separate paths referred to hereinafter as lens pathways (LP). The lens pathways are shown in FIG. 2. The light, from the illumination source 207, after reflecting from the target (not shown) is directed towards the objective 201. Further, the light travels through the left LP 203 and the right LP 205 before reaching the corresponding eyepiece. However, the Inter LP distance of the stereomicroscope described herein above is limited and fixed. The left LP and right LP, which lead to the right and the left eyepieces with optical images, are very close to each other, with a distance in the range of 22 millimeters to 26 millimeters to provide a stereo image. However, the average distance between the eyes of the human being is about 60 to 70 millimeters.

It is advantageous to have a stereomicroscope with a system for varying an inter-objective distance for increasing a depth of perception and a field of vision.

In the prior art microscopes that are available at present, the angle subtended between the Right Optical system and the Left Optical System at the target/object is fixed, limited and small. None of the currently available microscope has a facility for controlling the angle between the left optical system and the right optical system.

Hence, there is a need for a stereomicroscope with a variable inter-objective distance to provide an increased and variable depth of vision. Also there is a need to provide a stereo microscope with a system for controlling the angle subtended by the left optical system and the right optical system at a target as to increase a 3D effect and depth perception.

The above mentioned shortcomings, disadvantages and problems are addressed herein, which will be understood by reading the following specification.

OBJECTS OF THE EMBODIMENTS

The primary object of the embodiments herein is to provide a stereomicroscope with a variable inter-objective distance to vary an angle subtended between the right and the left optical paths at a target or an object.

Another object of the embodiments herein is to provide a stereomicroscope with two/dual objective lenses to provide two different and distinct optical paths for the right eye and the left eye.

Yet another object of the embodiments herein is to provide a stereomicroscope with dual objective lenses to provide an increased field and depth of vision.

Yet another object of the embodiments herein is to provide a stereomicroscope with dual objectives having a facility to vary inter-objective distance for increasing a depth of perception and a field of vision.

Yet another object of the embodiments herein is to provide a stereomicroscope with dual objective having variable inter objective distance so that each of the objectives is capable of independent movement about the axis of the stereomicroscope.

Yet another object of the embodiments herein is to provide a stereomicroscope in which the first and the second objectives undergo a non synchronous movement with respect to each other without compromising on a target fixation.

These and other objects and advantages of the embodiments herein will become readily apparent from the following detailed description taken in conjunction with the accompanying drawings.

SUMMARY

The embodiments herein provide a dual objective stereomicroscope. In one embodiment herein, the two objectives are positioned independent of each other at a predetermined distance from the axis of the stereomicroscope. Further, the objectives are configured to move along an angular axis to provide a variable inter objective distance. At each of the objective, at least one primary mirror is positioned such that the plane of the mirror is normal to the optical axis of the objective. The primary mirror is configured for a synchronous movement along with the objective. For an angular displacement of the objective, the mirror undergoes a synchronous lateral displacement. At least one focusing mirror is placed along the same orientation as that of the primary mirror so as to reflect the beam received from the first mirror onto an eyepiece.

According to one embodiment herein, a dual objective stereomicroscope comprises a housing. The housing includes at least two objectives which are positioned at a predetermined distance from each other and adapted for viewing an object. At least two primary mirrors are positioned such that a plane of the mirror is positioned normal to the objective to receive a beam of light from the objectives. At least two focusing mirrors are positioned at an orientation parallel to the primary mirror to receive a beam of light from the primary mirrors. At least two eyepieces are provided to receive a beam of light from the focusing mirrors.

The objectives herein are movable. The objectives herein move independent of each other using a mechanism. According to one embodiment, the objectives move synchronously with each other. According to one embodiment herein, the objectives move along an angular axis of the stereomicroscope. The primary mirror moves synchronously along with the objective. The focusing mirror reflects the light received from the primary mirror. The objectives are moved away from each other to provide a maximum visual angle of 135 degrees.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiments herein and the accompanying drawings in which.

Figure 1:
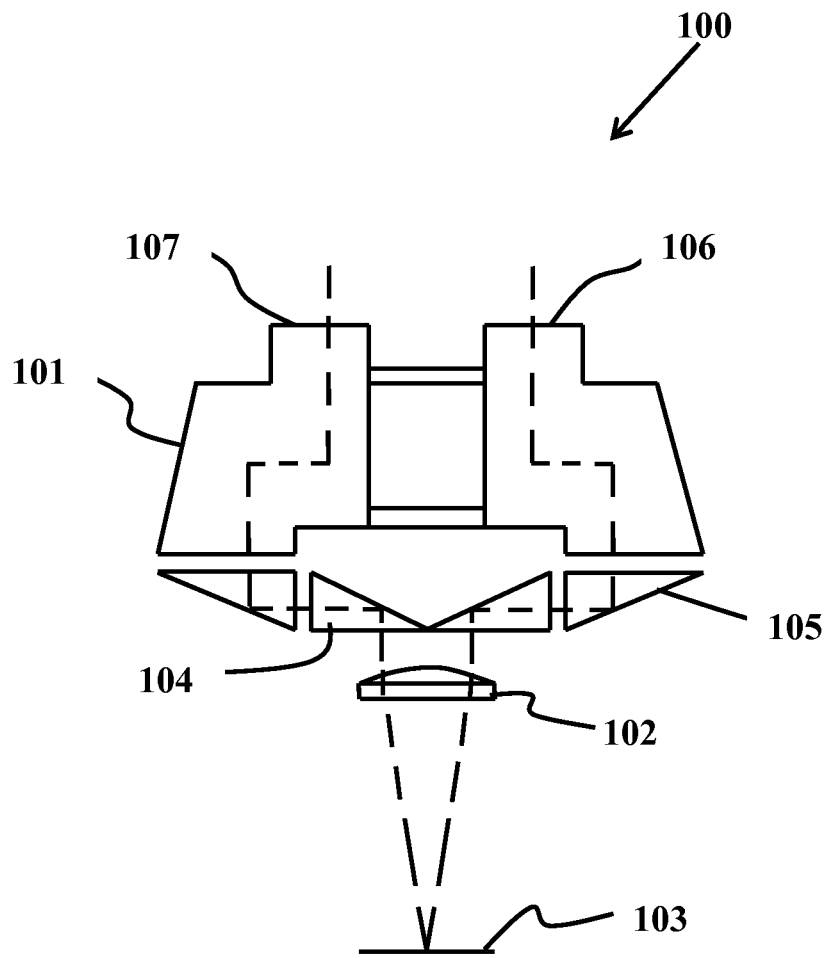
FIG. 1 shows the cross sectional view of a conventional stereomicroscope, according to an embodiment herein.
Figure 2A:
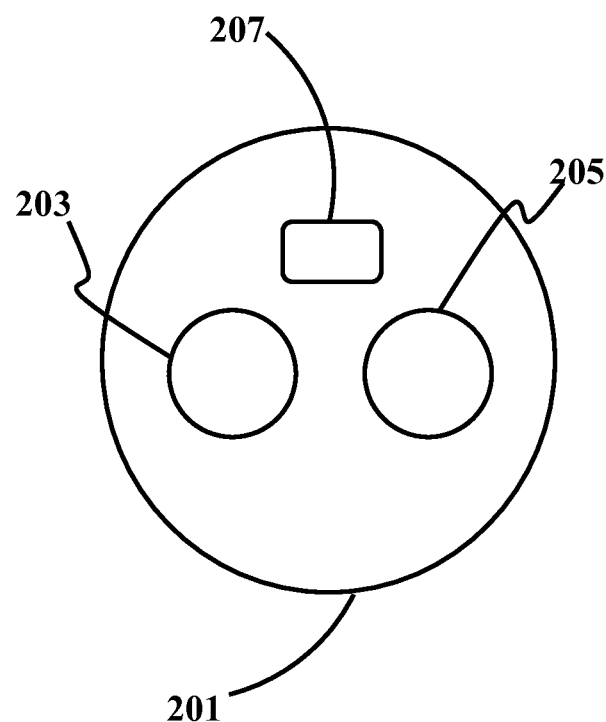
FIG. 2A shows the bottom view of an objective and lens pathways in a conventional stereomicroscope, according to an embodiment herein.
Figure 2B:
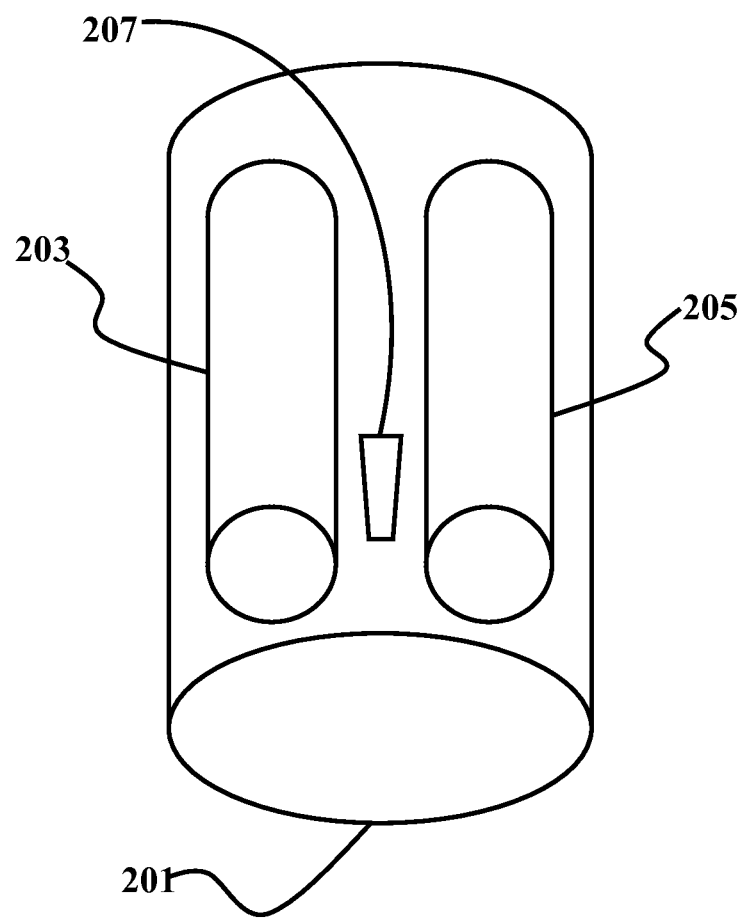
FIG. 2B shows a side view of an objective and lens pathways in a conventional stereomicroscope, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein provide a dual objective stereomicroscope to provide two distinct optical paths for the left and the right eyes to increase a visual angle to enhance a 3D effect. According to one embodiment herein, the two objectives are positioned independent of each other at a predetermined distance from the axis of the stereomicroscope. Further, the objectives are configured for movement along an angular axis to provide a variable inter objective distance. At each of the objective, at least one primary mirror is positioned such that the plane of the mirror is normal to the optic axis of the objective. The primary mirror is configured for synchronous movement along with the objective. For an angular displacement of the objective, the mirror undergoes a synchronous lateral displacement. At least one focusing mirror is placed along the same orientation as that of the primary mirror so as to reflect the beam received from the first mirror onto an eyepiece.

According to one embodiment herein, a dual objective stereomicroscope has a housing to accommodate two primary mirrors, two focusing mirrors and two objectives. Two eyepieces are optically connected to the two objectives respectively through one primary mirror and one focusing mirror. A mechanical movement mechanism is provided in the optical path of the two objectives to move the two focusing mirrors and the two objectives so that the distance between the two objectives is varied to a desired distance.

The stereomicroscope has two optical paths, namely a first optical path and a second optical path. The first optical path optically couples a first eye piece with a first objective lens. The first optical path further comprises a first primary mirror and a first focusing mirror. The second optical path optically couples a second eye piece with a second objective lens. The second optical path further comprises a second primary mirror and a second focusing mirror. The mechanical movement mechanism is provided to move the first objective lens and the second objective lens towards each other and away from each other.

The mechanical movement mechanism comprises a vertical midline central supporting frame and two horizontal and angled support rods attached to the vertical midline central supporting frame. The first objective lens and the second objective lens along with the first primary mirror and the second primary mirror are supported by the two horizontal and angled support rods. Each horizontal and angled support rod has two tubes coupled telescopically. Each horizontal and angled support rod is driven mechanically or electrically to move the first objective lens and the second objective lens towards and away from each other. Each horizontal and angled support rod is operated individually.

A first optical unit comprising the first objective lens and the first primary mirror is coupled to a first horizontal and angled support rod through a first pivotal joint. A second optical unit comprising the second objective lens along and the second primary mirror is coupled to a second horizontal and angled support rod through a second pivotal joint. The first pivotal joint and the second pivotal respectively allows the first optical unit and the second optical unit to tilt around on axis passing at right angles to a longitudinal axis. The tilting movement of the optical units is executed using mechanical devices or electrical motors. The tilt allows the optics of the microscope to re-align the optics with the target, when the first optical unit and the second optical unit are separated apart to increase 3D angles and 3D effect or brought closer to reduce 3D angle and effect.

Figure 3:
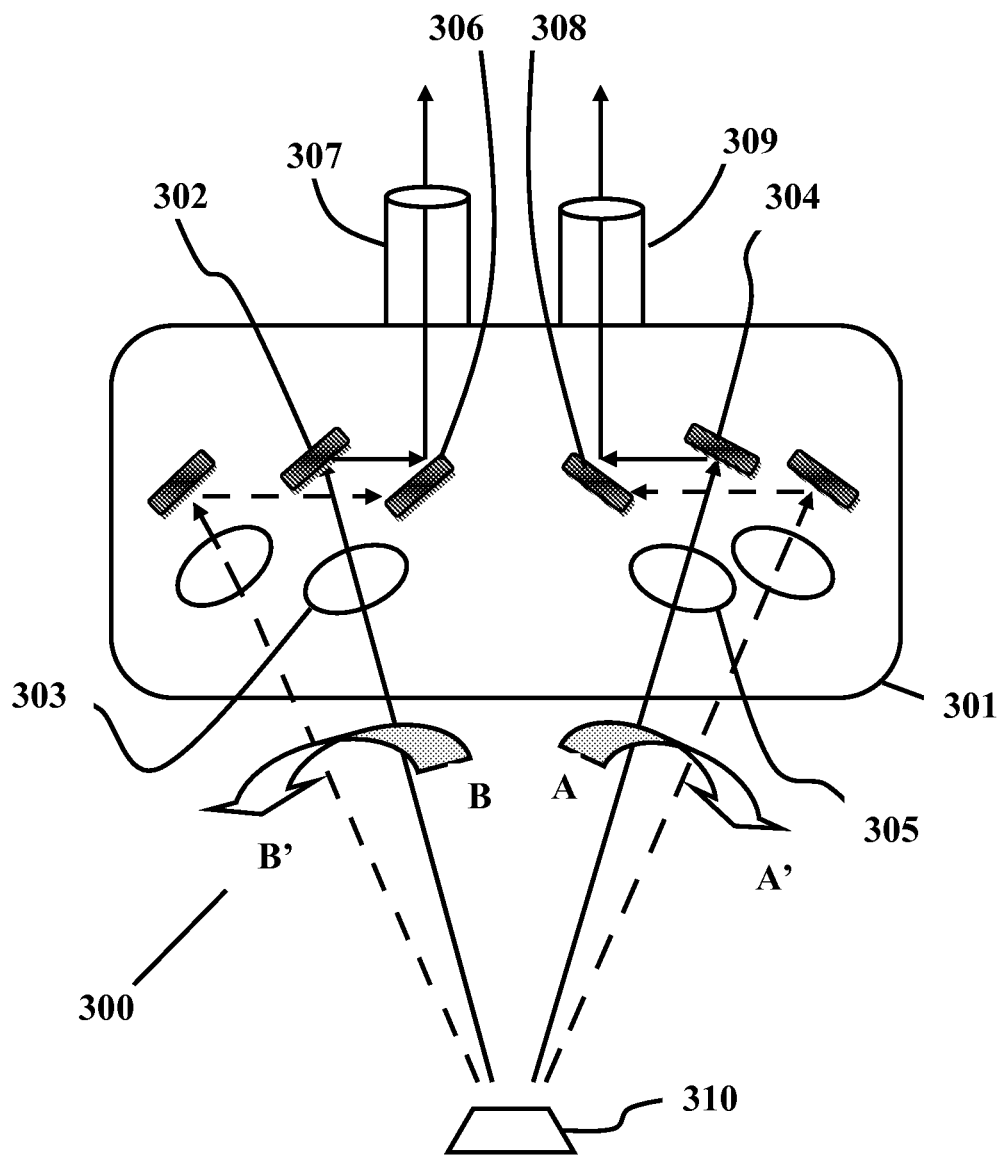
FIG. 3 shows a schematic block diagram of the dual objective stereomicroscope, according to an embodiment herein.

FIG. 3 shows a cross-sectional line diagram of the dual objective stereomicroscope 300 according to an embodiment herein. The stereomicroscope 300 has a housing 301. Two objectives 303 and 305 are positioned independent of each other at a predetermined distance from the axis of the stereo microscope. At least one primary mirror 302 is positioned such that the plane of the mirror is normal to the optic axis of the objective 303. The primary mirror 302 is configured for synchronous movement along with the objective 303. At least one secondary mirror 304 is positioned such that the plane of the mirror is normal to the optic axis of the objective 305. The secondary mirror 304 is configured for synchronous movement along with the objective 305. At least one focusing mirror 306 is placed along the same orientation as that of the primary mirror 302 so as to reflect the beam received from the primary mirror 302 onto an eyepiece 307. At least another focusing mirror 308 is placed along the same orientation as that of the secondary mirror 304 so as to reflect the beam received from the primary mirror 304 onto an eyepiece 309. The two objectives 303 and 305 are capable of independent movement from each other within the housing. The objective 303 is capable of movement from a position B to position B'. Similarly, the objective 305 is capable of movement from a position A to position A'. This allows the inter-objective distance to vary and provide a greater degree of 3-dimensional vision.

Figure 4A:
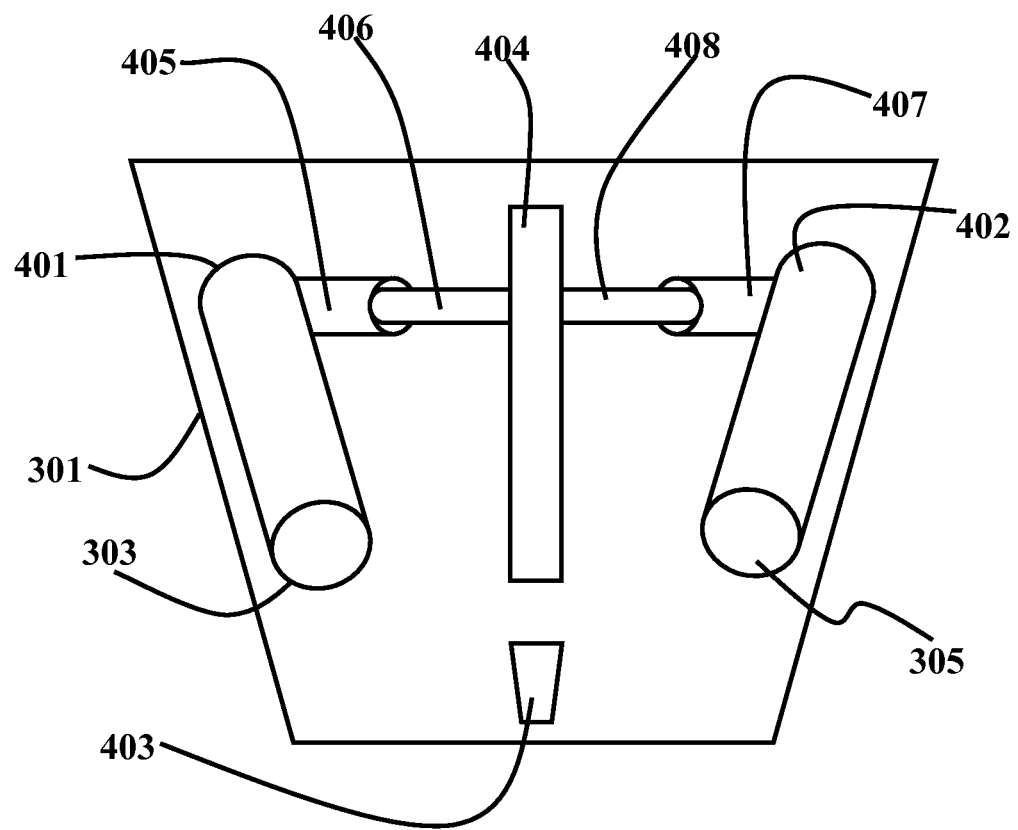
FIG. 4A shows a side sectional view of an objective and lens pathways in a dual objective stereomicroscope, according to an embodiment herein.

FIG. 4A shows a vertical cross sectional block diagram of the objective and lens pathways in a dual objective stereomicroscope according to an embodiment herein. The housing 301 comprises of objectives 303 and 305. Light rays from the illumination source 403 falls on the two objectives 303 and 305. The two objectives are capable of independent movement from each other about the axis of the stereomicroscope. The light rays from the objective 303 are passed through an optical path. The light rays from the objective 405 are passed through another optical path. Each of the objective lens pathway system is capable of movement within the housing. The independent movement of the two objectives within the housing causes an increase in the inter-objective distance. The inter-objective distance is varied to increase a maximum visual angle of 90 degrees or 135 degrees to increase the depth of perception and field of vision.

The mechanical movement mechanism comprises a vertical midline central supporting frame 404 and two horizontal and angled support rods 405 &406, 407&408 attached to the vertical midline central supporting frame 404. The first objective lens 303 and the second objective lens 305 along with the first primary mirror and the second primary mirror are supported by the two horizontal and angled support rods 405 &406, 407&408. Each horizontal and angled support rod has two tubes coupled telescopically. Each horizontal and angled support rod is driven mechanically or electrically to move the first objective lens 303 and the second objective lens 305 towards and away from each other. Each horizontal and angled support rod is operated individually.

A first optical unit 401 comprising the first objective lens 303 and the first primary mirror is coupled to a first horizontal and angled support rod 405 through a first pivotal joint. A second optical unit 402 comprising the second objective lens 305 along and the second primary mirror is coupled to a second horizontal and angled support rod 407 through a second pivotal joint. The first pivotal joint and the second pivotal respectively allows the first optical unit 401 and the second optical unit 402 to tilt around on axis passing at right angles to a longitudinal axis. The tilting movement of the optical units 401, 402 is executed using mechanical devices or electrical motors. The till allows the optics of the microscope to re-align optics with the target, when the first optical unit 401 and the second optical units 402 are separated apart to increase 3D angles and 3D effect or brought closer to reduce 3D angle and effect.

Figure 4B:
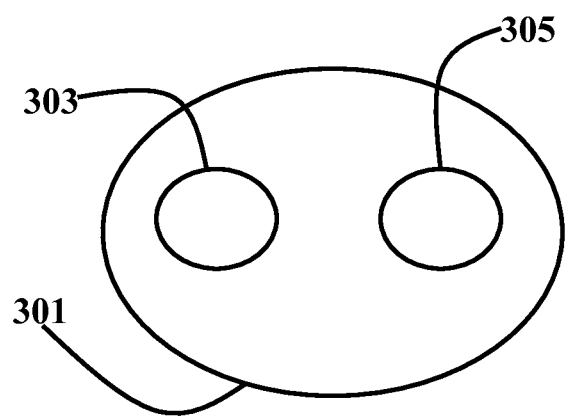
FIG. 4B shows a bottom side view of an objective and lens pathways in a dual objective stereomicroscope, according to an embodiment herein.

FIG. 4B shows the bottom up view of the objective and lens pathways in a dual objective stereomicroscope according to an embodiment herein. The housing 301 comprises of objectives 303 and 305. Further, each of the objective 303 and 305 has a distinct lens pathway for focusing the light from the target onto the eyepiece.

According to an embodiment herein, the inter-objective distance is varied by a mechanical and optical device in the objectives of housing of the stereomicroscope, allowing the microscope to focus on the objects with a greater degree of 3-dimensional vision.

According to an embodiment herein, each of the objective lens pathway system is capable of movement within the housing. By varying the inter-objective distance using a mechanical and optical device in the objectives of housing of the stereomicroscope, the microscope is enabled to focus on the objects with a greater degree of 3-dimensional vision.

The embodiments herein provide a stereomicroscope with dual objective lens so that each of the objective lens is moved independent of each other about the axis of the stereomicroscope to increase the depth of perception of a target and to increase a field of vision of a target. The first objective lens and the second objective lens are moved synchronously or asynchronously without compromising on a target fixation.

The foregoing description of the specific embodiments herein will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments herein, it will be obvious for a person skilled in the art to practice the embodiments herein with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A dual objective stereomicroscope comprising:
   a housing;
   a first eye piece;
   a second eye piece;
   a first objective lens;
   a second objective lens;
   a first primary mirror;
   a second primary mirror; and
   a movement mechanism;
   wherein the movement mechanism changes a distance between the first objective lens and the second objective lens towards or away from each other so that the first objective lens and the second objective lens are always focused on an object and an image of the object viewed through the first objective lens and the second objective lens is projected to a user through the first eye piece and the second eye piece to provide a stereoscopic effect.

2. The stereomicroscope according to claim 1, wherein the first eye piece, the first primary mirror, the first focusing mirror and the first objective lens are arranged on a first optical path.

3. The stereomicroscope according to claim 1, wherein the second eye piece, the second primary mirror, the second focusing mirror and the second objective lens are arranged on a second optical path.

4. The stereomicroscope according to claim 1, wherein the first primary mirror and the second primary mirror are positioned such that a plane of the first primary mirror is normal to the first objective lens to receive a beam of light from the first objective lens and a plane of the second primary mirror is normal to the second objective lens to receive a beam of light from the second objective lens.

5. The stereomicroscope according to claim 1, wherein the first focusing mirror and the second primary mirror are respectively positioned in parallel to the plane of the first primary mirror and the second primary mirror to receive and reflect a beam of light from the first primary mirror and the second primary mirror.

6. The stereomicroscope according to claim 1, wherein the first eye piece and the second eye piece are positioned to receive the beam of light reflected from the first focusing mirror and the second focusing mirror respectively to provide a stereoscopic effect.

7. The stereomicroscope according to claim 1, wherein the first objective lens and the second objective lens are moved independent of each other.

8. The stereomicroscope according to claim 1, wherein the first objective lens and the second objective lens are moved synchronously with each other.

9. The stereomicroscope according to claim 1, wherein the wherein the first objective lens and the second objective lens are moved along an angular axis.

10. The stereomicroscope according to claim 1, wherein the first primary mirror is moved synchronously along with the first objective lens and the second primary mirror is moved synchronously along with the second objective lens.

11. The stereomicroscope according to claim 1, wherein the first objective lens and the second objective lens are moved away from each other to provide a maximum visual angle of 135 degrees.

12. The stereomicroscope according to claim 1, wherein the movement mechanism comprises a vertical midline central supporting frame, a first horizontal and angled support rod and a second horizontal and angled support rod.

13. The stereomicroscope according to claim 1, wherein the first horizontal and angled support rod and the second horizontal and angled support rod are coupled to the vertical midline central supporting frame on either side.

14. The stereomicroscope according to claim 1, wherein the first horizontal and angled support rod is coupled to a first optical unit through a first pivotal joint.

15. The stereomicroscope according to claim 1, wherein first optical unit includes the first objective lens and the first primary mirror.

16. The stereomicroscope according to claim 1, wherein the second horizontal and angled support rod is coupled to a second optical unit through a second pivotal joint.

17. The stereomicroscope according to claim 1, wherein second optical unit includes the second objective lens and the second primary mirror.

18. The stereomicroscope according to claim 1, wherein both the first horizontal and angled support rod and the second horizontal and angled support rod has two tubes coupled telescopically.

19. The stereomicroscope according to claim 1, wherein the first horizontal and angled support rod and the second horizontal and angled support rod are moved independently to move the first optical unit and the second optical unit away from each other to increase 3D viewing angle to enhance a 3D effect or to move the first optical unit and the second optical unit closer towards each other to decrease a 3D viewing angle to reduce a 3D effect.

20. The stereomicroscope according to claim 1, wherein the first horizontal and angled support rod and the second horizontal and angled support rod are moved mechanically or electrically.

* * * * *